(12) United States Patent
Sripada

(10) Patent No.: US 10,803,599 B2
(45) Date of Patent: *Oct. 13, 2020

(54) METHOD AND APPARATUS FOR MOTION DETECTION

(71) Applicant: ARRIA DATA2TEXT LIMITED, Aberdeen (GB)

(72) Inventor: Gowri Somayajulu Sripada, Westhill (GB)

(73) Assignee: Arria Data2Text Limited, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,445

(22) Filed: Sep. 26, 2018

(65) Prior Publication Data

US 2019/0197697 A1 Jun. 27, 2019

Related U.S. Application Data

(63) Continuation of application No. 14/650,763, filed as application No. PCT/IB2012/057773 on Dec. 27, 2012, now Pat. No. 10,115,202.

(51) Int. Cl.
*G06T 7/20* (2017.01)
*G06K 9/62* (2006.01)
(Continued)

(52) U.S. Cl.
CPC ............... *G06T 7/20* (2013.01); *G06F 40/40* (2020.01); *G06K 9/00718* (2013.01); *G06K 9/62* (2013.01);
(Continued)

(58) Field of Classification Search
None
See application file for complete search history.

(56) References Cited

U.S. PATENT DOCUMENTS 5,181,250 A * 1/1993 Morgan ............ G01C 21/3629
340/988
5,237,502 A 8/1993 White et al.
(Continued)

FOREIGN PATENT DOCUMENTS

AU 2011247830 B2 12/2011
AU 2011253627 B2 12/2011
(Continued)

OTHER PUBLICATIONS

Notice of Allowance for U.S. Appl. No. 15/188,423 dated Dec. 28, 2018.
(Continued)

*Primary Examiner* — Nancy Bitar
(74) *Attorney, Agent, or Firm* — Alston & Bird LLP

(57) ABSTRACT

Image analysis techniques may be employed to identify moving and/or static object within a sequence of spatial data frames (102, 300). Attributes of interest may be identified within a sequence of spatial data frames (102, 300). The attributes of interest may be clustered and examined across frames of the spatial data to detect motion vectors. A system (200) may derive information about these attributes of interest and their motion over time and identify moving and/or static objects, and the moving and/or static objects may be used to generate natural language messages describing the motion of the attributes of interest. Example uses include description of moving and/or static objects in data such as weather data, oil spills, cellular growth (e.g., tumor progression), atmospheric conditions (e.g., the size of a hole in the ozone layer), or any other implementation where it may be desirable to detect motion vectors in a sequence of spatial data frames.

18 Claims, 9 Drawing Sheets

(51) Int. Cl.
  *G06T 7/246* (2017.01)
  *G06K 9/00* (2006.01)
  *G06F 40/40* (2020.01)
(52) U.S. Cl.
  CPC .... *G06T 7/246* (2017.01); *G06T 2207/30192* (2013.01)

(56) References Cited

U.S. PATENT DOCUMENTS

| | | |
|---|---|---|
| 5,311,429 A | 5/1994 | Tominaga |
| 5,321,608 A | 6/1994 | Namba et al. |
| 5,629,687 A | 5/1997 | Sutton et al. |
| 5,794,177 A | 8/1998 | Carus et al. |
| 5,802,488 A | 9/1998 | Edatsune |
| 6,023,669 A | 2/2000 | Suda et al. |
| 6,078,914 A | 6/2000 | Redfern |
| 6,138,087 A | 10/2000 | Budzinski |
| 6,266,617 B1 | 7/2001 | Evans |
| 6,424,370 B1 | 7/2002 | Courtney |
| 6,442,485 B2 | 8/2002 | Evans |
| 6,466,899 B1 | 10/2002 | Yano et al. |
| 6,665,640 B1 | 12/2003 | Bennett et al. |
| 6,717,513 B1 | 4/2004 | Sandelman et al. |
| 6,947,885 B2 | 9/2005 | Bangalore et al. |
| 7,043,420 B2 | 5/2006 | Ratnaparkhi |
| 7,167,824 B2 | 1/2007 | Kalulli |
| 7,231,341 B2 | 6/2007 | Bangalore et al. |
| 7,238,313 B2 | 7/2007 | Ferencz et al. |
| 7,269,516 B2 | 9/2007 | Brunner et al. |
| 7,305,336 B2 | 12/2007 | Polanyi et al. |
| 7,310,969 B2 | 12/2007 | Dale |
| 7,346,493 B2 | 3/2008 | Ringger et al. |
| 7,418,447 B2 | 8/2008 | Caldwell et al. |
| 7,424,363 B2 | 9/2008 | Cheng et al. |
| 7,444,287 B2 | 10/2008 | Claudatos et al. |
| 7,496,621 B2 | 2/2009 | Pan et al. |
| 7,526,424 B2 | 4/2009 | Corston-Oliver et al. |
| 7,533,089 B2 | 5/2009 | Pan et al. |
| 7,542,934 B2 | 6/2009 | Markel |
| 7,562,005 B1 | 7/2009 | Bangalore et al. |
| 7,684,991 B2 | 3/2010 | Stohr et al. |
| 7,711,581 B2 | 5/2010 | Hood et al. |
| 7,783,486 B2 | 8/2010 | Rosser et al. |
| 7,809,552 B2 | 10/2010 | Pan et al. |
| 7,849,048 B2 | 12/2010 | Langseth et al. |
| 7,849,049 B2 | 12/2010 | Langseth et al. |
| 7,856,390 B2 | 12/2010 | Schiller |
| 7,873,509 B1 | 1/2011 | Budzinski |
| 7,921,091 B2 | 4/2011 | Cox et al. |
| 7,930,169 B2 | 4/2011 | Billerey-Mosier |
| 7,933,774 B1 | 4/2011 | Begeja et al. |
| 7,966,172 B2 | 6/2011 | Ruiz et al. |
| 7,970,601 B2 | 6/2011 | Burmester et al. |
| 7,979,267 B2 | 7/2011 | Ruiz et al. |
| 8,019,610 B2 | 9/2011 | Walker et al. |
| 8,024,331 B2 | 9/2011 | Calistri-Yeh et al. |
| 8,037,000 B2 | 10/2011 | Delmonico et al. |
| 8,082,144 B1 | 12/2011 | Brown et al. |
| 8,090,727 B2 | 1/2012 | Lachtarnik et al. |
| 8,150,676 B1 | 4/2012 | Kaeser |
| 8,175,873 B2 | 5/2012 | Di Fabbrizio et al. |
| 8,180,647 B2 | 5/2012 | Walker et al. |
| 8,180,758 B1 | 5/2012 | Cornali |
| 8,229,937 B2 | 7/2012 | Kiefer et al. |
| 8,335,786 B2 | 12/2012 | Pereira et al. |
| 8,345,984 B2 | 1/2013 | Ji et al. |
| 8,355,903 B1 | 1/2013 | Birnbaum et al. |
| 8,374,848 B1 | 2/2013 | Birnbaum et al. |
| 8,425,325 B2 | 4/2013 | Hope |
| 8,473,911 B1 | 6/2013 | Baxter |
| 8,494,944 B2 | 7/2013 | Schiller |
| 8,515,733 B2 | 8/2013 | Jansen |
| 8,515,737 B2 | 8/2013 | Allen |
| 8,548,814 B2 | 10/2013 | Manuel-Devadoss |
| 8,548,915 B2 | 10/2013 | Antebi et al. |
| 8,561,014 B2 | 10/2013 | Mengusoglu et al. |
| 8,566,090 B2 | 10/2013 | Di Fabbrizio et al. |
| 8,589,148 B2 | 11/2013 | Atallah et al. |
| 8,589,172 B2 | 11/2013 | Alonso et al. |
| 8,616,896 B2 | 12/2013 | Lennox |
| 8,620,669 B2 | 12/2013 | Walker et al. |
| 8,626,613 B2 | 1/2014 | Dale et al. |
| 8,630,844 B1 | 1/2014 | Nichols et al. |
| 8,645,291 B2 | 2/2014 | Hawkins et al. |
| 8,655,889 B2 | 2/2014 | Hua et al. |
| 8,676,691 B2 | 3/2014 | Schiller |
| 8,688,434 B1 | 4/2014 | Birnbaum et al. |
| 8,700,396 B1 | 4/2014 | Mengibar et al. |
| 8,738,384 B1 | 5/2014 | Bansal et al. |
| 8,738,558 B2 | 5/2014 | Antebi et al. |
| 8,762,134 B2 | 5/2014 | Reiter |
| 8,762,133 B2 | 6/2014 | Reiter |
| 8,775,161 B1 | 7/2014 | Nichols et al. |
| 8,825,533 B2 | 9/2014 | Basson et al. |
| 8,843,363 B2 | 9/2014 | Birnbaum et al. |
| 8,849,670 B2 | 9/2014 | Di Cristo et al. |
| 8,874,584 B1 | 10/2014 | Chen et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,898,063 B1 | 11/2014 | Sykes et al. |
| 8,903,711 B2 | 12/2014 | Lundberg et al. |
| 8,903,718 B2 | 12/2014 | Akuwudike |
| 8,909,595 B2 | 12/2014 | Gandy et al. |
| 8,914,452 B2 | 12/2014 | Boston et al. |
| 8,924,330 B2 | 12/2014 | Antebi et al. |
| 8,930,305 B2 | 1/2015 | Namburu et al. |
| 8,977,953 B1 | 3/2015 | Pierre et al. |
| 8,984,051 B2 | 3/2015 | Olsen et al. |
| 9,002,695 B2 | 4/2015 | Watanabe et al. |
| 9,002,869 B2 | 4/2015 | Riezler et al. |
| 9,015,730 B1 | 4/2015 | Allen et al. |
| 9,028,260 B2 | 5/2015 | Nanjiani et al. |
| 9,092,276 B2 | 7/2015 | Allen et al. |
| 9,104,720 B2 | 8/2015 | Rakshit et al. |
| 9,110,882 B2 | 8/2015 | Overell et al. |
| 9,110,977 B1 | 8/2015 | Pierre et al. |
| 9,111,534 B1 | 8/2015 | Sylvester et al. |
| 9,135,244 B2 | 9/2015 | Reiter |
| 9,135,662 B2 | 9/2015 | Evenhouse et al. |
| 9,146,904 B2 | 9/2015 | Allen |
| 9,164,982 B1 | 10/2015 | Kaeser |
| 9,190,054 B1 | 11/2015 | Riley et al. |
| 9,198,621 B2 * | 12/2015 | Fernstrom ............ A61B 5/1123 |
| 9,208,147 B1 | 12/2015 | Nichols et al. |
| 9,229,927 B2 | 1/2016 | Wolfram et al. |
| 9,240,197 B2 | 1/2016 | Begeja et al. |
| 9,244,894 B1 | 1/2016 | Dale et al. |
| 9,251,134 B2 | 2/2016 | Birnbaum et al. |
| 9,251,143 B2 | 2/2016 | Bird et al. |
| 9,263,039 B2 | 2/2016 | Di Cristo et al. |
| 9,268,770 B1 | 2/2016 | Kursun |
| 9,323,743 B2 | 4/2016 | Reiter |
| 9,405,448 B2 | 8/2016 | Reiter |
| 9,600,471 B2 | 3/2017 | Bradshaw et al. |
| 9,640,045 B2 | 5/2017 | Reiter |
| 9,990,360 B2 | 6/2018 | Sripada |
| 10,026,274 B2 | 7/2018 | Reiter |
| 10,115,202 B2 * | 10/2018 | Sripada .................. G06K 9/62 |
| 10,467,347 B1 * | 11/2019 | Reiter .................. G06F 40/284 |
| 2002/0026306 A1 | 2/2002 | Bangalore et al. |
| 2003/0131315 A1 * | 7/2003 | Escher .................. G06Q 40/06 |
| | | 715/255 |
| 2003/0212545 A1 | 11/2003 | Kalulli |
| 2004/0141654 A1 | 7/2004 | Jeng |
| 2004/0186723 A1 | 9/2004 | Mizutani et al. |
| 2004/0246120 A1 | 12/2004 | Benner et al. |
| 2005/0039107 A1 | 2/2005 | Hander et al. |
| 2005/0203927 A1 | 9/2005 | Sull et al. |
| 2005/0228635 A1 | 10/2005 | Araki et al. |
| 2005/0256703 A1 | 11/2005 | Markel |
| 2005/0289183 A1 | 12/2005 | Kaneko et al. |
| 2006/0085667 A1 | 4/2006 | Kubota et al. |
| 2006/0178868 A1 | 8/2006 | Billerey-Mosier |

(56) References Cited

U.S. PATENT DOCUMENTS

| | | |
|---|---|---|
| 2006/0200253 A1 | 9/2006 | Hoffberg et al. |
| 2006/0259293 A1 | 11/2006 | Orwant |
| 2007/0078655 A1 | 4/2007 | Semkow et al. |
| 2007/0106628 A1 | 5/2007 | Adjali et al. |
| 2007/0112511 A1 | 5/2007 | Burfeind et al. |
| 2007/0129942 A1* | 6/2007 | Ban .................. G06F 40/169 704/235 |
| 2007/0143099 A1 | 6/2007 | Balchandran et al. |
| 2008/0221865 A1 | 9/2008 | Wellmann |
| 2008/0221870 A1 | 9/2008 | Attardi et al. |
| 2008/0281781 A1 | 11/2008 | Zhao et al. |
| 2008/0312954 A1 | 12/2008 | Ullrich et al. |
| 2009/0089100 A1 | 4/2009 | Nenov et al. |
| 2009/0089126 A1 | 4/2009 | Odubiyi |
| 2009/0111486 A1 | 4/2009 | Burstrom |
| 2009/0156229 A1 | 6/2009 | Hein et al. |
| 2009/0198496 A1 | 8/2009 | Denecke |
| 2009/0222482 A1 | 9/2009 | Klassen et al. |
| 2009/0281839 A1 | 11/2009 | Lynn et al. |
| 2009/0286514 A1 | 11/2009 | Lichorowic et al. |
| 2009/0287567 A1 | 11/2009 | Penberthy et al. |
| 2010/0146491 A1 | 6/2010 | Hirano et al. |
| 2010/0153095 A1 | 6/2010 | Yang et al. |
| 2010/0153321 A1 | 6/2010 | Savvides et al. |
| 2010/0174545 A1 | 7/2010 | Otani |
| 2010/0191658 A1 | 7/2010 | Kannan et al. |
| 2010/0203970 A1 | 8/2010 | Hope |
| 2010/0281440 A1 | 11/2010 | Underkoffler et al. |
| 2010/0332235 A1 | 12/2010 | David |
| 2011/0010164 A1 | 1/2011 | Williams |
| 2011/0040760 A1 | 2/2011 | Fleischman et al. |
| 2011/0068929 A1 | 3/2011 | Franz et al. |
| 2011/0087486 A1 | 4/2011 | Schiller |
| 2011/0160986 A1 | 6/2011 | Wu et al. |
| 2011/0179006 A1 | 7/2011 | Cox et al. |
| 2011/0182469 A1 | 7/2011 | Ji et al. |
| 2011/0218822 A1 | 9/2011 | Buisman et al. |
| 2011/0225185 A1 | 9/2011 | Gupta |
| 2011/0257839 A1 | 10/2011 | Mukherjee |
| 2012/0078888 A1 | 3/2012 | Brown et al. |
| 2012/0084027 A1 | 4/2012 | Caine |
| 2012/0131008 A1 | 5/2012 | Ahn et al. |
| 2012/0136649 A1 | 5/2012 | Freising et al. |
| 2012/0158089 A1 | 6/2012 | Bocek et al. |
| 2012/0173475 A1 | 7/2012 | Ash et al. |
| 2012/0265764 A1 | 10/2012 | Agrawal et al. |
| 2012/0290289 A1 | 11/2012 | Manera et al. |
| 2012/0310990 A1 | 12/2012 | Viegas et al. |
| 2013/0030810 A1 | 1/2013 | Kopparapu et al. |
| 2013/0066873 A1 | 3/2013 | Salvetti et al. |
| 2013/0129307 A1 | 5/2013 | Choe et al. |
| 2013/0144606 A1 | 6/2013 | Birnbaum et al. |
| 2013/0145242 A1 | 6/2013 | Birnbaum et al. |
| 2013/0151238 A1 | 6/2013 | Beaurpere et al. |
| 2013/0174026 A1 | 7/2013 | Locke |
| 2013/0185050 A1 | 7/2013 | Bird et al. |
| 2013/0211855 A1 | 8/2013 | Eberle et al. |
| 2013/0238329 A1 | 9/2013 | Casella dos Santos |
| 2013/0238330 A1 | 9/2013 | Casella dos Santos |
| 2013/0238987 A1 | 9/2013 | Lutwyche |
| 2013/0251233 A1 | 9/2013 | Yang et al. |
| 2013/0268263 A1 | 10/2013 | Park et al. |
| 2013/0293363 A1 | 11/2013 | Plymouth et al. |
| 2013/0297293 A1 | 11/2013 | Di Cristo et al. |
| 2013/0311201 A1 | 11/2013 | Chatfield et al. |
| 2014/0019531 A1 | 1/2014 | Czajka et al. |
| 2014/0025371 A1 | 1/2014 | Min |
| 2014/0039878 A1 | 2/2014 | Wasson |
| 2014/0052696 A1 | 2/2014 | Soroushian |
| 2014/0062712 A1 | 3/2014 | Reiter |
| 2014/0067377 A1 | 3/2014 | Reiter |
| 2014/0072947 A1 | 3/2014 | Boguraev et al. |
| 2014/0072948 A1 | 3/2014 | Boguraev et al. |
| 2014/0089212 A1 | 3/2014 | Sbodio |
| 2014/0100846 A1 | 4/2014 | Haine et al. |
| 2014/0100901 A1 | 4/2014 | Haine et al. |
| 2014/0100923 A1 | 4/2014 | Strezo et al. |
| 2014/0143720 A1 | 5/2014 | Dimarco et al. |
| 2014/0149107 A1 | 5/2014 | Schilder |
| 2014/0164303 A1 | 6/2014 | Bagchi et al. |
| 2014/0164304 A1 | 6/2014 | Bagchi et al. |
| 2014/0188477 A1 | 7/2014 | Zhang |
| 2014/0201126 A1 | 7/2014 | Zadeh et al. |
| 2014/0278358 A1 | 9/2014 | Byron et al. |
| 2014/0281935 A1 | 9/2014 | Byron et al. |
| 2014/0281951 A1 | 9/2014 | Megiddo et al. |
| 2014/0297268 A1 | 10/2014 | Govrin et al. |
| 2014/0300684 A1 | 10/2014 | Fagadar-Cosma et al. |
| 2014/0316768 A1 | 10/2014 | Khandekar |
| 2014/0375466 A1 | 12/2014 | Reiter |
| 2014/0379322 A1 | 12/2014 | Koutrika et al. |
| 2014/0379378 A1 | 12/2014 | Cohen-Solal et al. |
| 2015/0006437 A1 | 1/2015 | Byron et al. |
| 2015/0032443 A1 | 1/2015 | Karov et al. |
| 2015/0081299 A1 | 3/2015 | Jasinschi et al. |
| 2015/0081307 A1 | 3/2015 | Cederstrom et al. |
| 2015/0081321 A1 | 3/2015 | Jain |
| 2015/0095015 A1 | 4/2015 | Lani et al. |
| 2015/0106307 A1 | 4/2015 | Antebi et al. |
| 2015/0142418 A1 | 5/2015 | Byron et al. |
| 2015/0142421 A1 | 5/2015 | Buurman et al. |
| 2015/0154359 A1 | 6/2015 | Harris et al. |
| 2015/0163358 A1 | 6/2015 | Klemm et al. |
| 2015/0169522 A1 | 6/2015 | Logan et al. |
| 2015/0169548 A1 | 6/2015 | Reiter |
| 2015/0169659 A1 | 6/2015 | Lee et al. |
| 2015/0169720 A1 | 6/2015 | Byron et al. |
| 2015/0169737 A1 | 6/2015 | Byron et al. |
| 2015/0179082 A1 | 6/2015 | Byron et al. |
| 2015/0227508 A1 | 8/2015 | Howald et al. |
| 2015/0242384 A1 | 8/2015 | Reiter |
| 2015/0261744 A1 | 9/2015 | Suenbuel et al. |
| 2015/0261836 A1 | 9/2015 | Madhani et al. |
| 2015/0279348 A1 | 10/2015 | Cao et al. |
| 2015/0310013 A1 | 10/2015 | Allen et al. |
| 2015/0310112 A1 | 10/2015 | Allen et al. |
| 2015/0310861 A1 | 10/2015 | Waltermann et al. |
| 2015/0324343 A1 | 11/2015 | Carter et al. |
| 2015/0324351 A1 | 11/2015 | Sripada et al. |
| 2015/0324374 A1 | 11/2015 | Sripada et al. |
| 2015/0324413 A1 | 11/2015 | Gubin et al. |
| 2015/0325000 A1* | 11/2015 | Sripada .................. G06K 9/62 382/103 |
| 2015/0326622 A1 | 11/2015 | Carter et al. |
| 2015/0331845 A1 | 11/2015 | Guggilla et al. |
| 2015/0331846 A1 | 11/2015 | Guggilla et al. |
| 2015/0332670 A1 | 11/2015 | Akbacak et al. |
| 2015/0356127 A1 | 12/2015 | Pierre et al. |
| 2015/0363363 A1 | 12/2015 | Bohra et al. |
| 2015/0363364 A1 | 12/2015 | Sripada |
| 2015/0363382 A1 | 12/2015 | Bohra et al. |
| 2015/0363390 A1 | 12/2015 | Mungi et al. |
| 2015/0363391 A1 | 12/2015 | Mungi et al. |
| 2015/0371651 A1 | 12/2015 | Aharoni et al. |
| 2016/0019200 A1 | 1/2016 | Allen |
| 2016/0027125 A1 | 1/2016 | Bryce |
| 2016/0055150 A1 | 2/2016 | Bird et al. |
| 2016/0132489 A1 | 5/2016 | Reiter |
| 2016/0140090 A1 | 5/2016 | Dale et al. |
| 2016/0328385 A1 | 11/2016 | Reiter |
| 2017/0018107 A1 | 1/2017 | Reiter |
| 2018/0349361 A1 | 12/2018 | Sripada |
| 2019/0035232 A1 | 1/2019 | Reiter |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1336955 B1 | 5/2006 |

(56) References Cited

FOREIGN PATENT DOCUMENTS

| | | | |
|---|---|---|---|
| EP | 2707809 A1 | 3/2014 |
| EP | 2750759 A1 | 7/2014 |
| EP | 2849103 A2 | 3/2015 |
| GB | 2518192 A | 3/2015 |
| JP | 61-221873 A | 10/1986 |
| JP | 2004-21791 A | 1/2004 |
| JP | 2014165766 A | 9/2014 |
| WO | WO 2000/074394 A2 | 12/2000 |
| WO | WO 2002/031628 A2 | 4/2002 |
| WO | WO 2002/073449 A1 | 9/2002 |
| WO | WO 2002/073531 A1 | 9/2002 |
| WO | WO 2002/031628 A3 | 10/2002 |
| WO | WO 2006/010044 A2 | 1/2006 |
| WO | WO 2007/041221 A1 | 4/2007 |
| WO | WO 2009/014465 A2 | 1/2009 |
| WO | WO 2010/049925 A2 | 5/2010 |
| WO | WO 2010/051404 A1 | 5/2010 |
| WO | WO 2012/071571 A2 | 5/2012 |
| WO | WO 2013/009613 A1 | 1/2013 |
| WO | WO 2013/042115 A2 | 3/2013 |
| WO | WO 2013/042116 A1 | 3/2013 |
| WO | WO 2013/177280 A1 | 11/2013 |
| WO | WO 2014/035402 A1 | 3/2014 |
| WO | WO 2014/098560 A2 | 6/2014 |
| WO | WO 2014/102568 A1 | 7/2014 |
| WO | WO 2014/140977 A1 | 9/2014 |
| WO | WO 2014/187076 A1 | 11/2014 |
| WO | WO 2015/028844 A1 | 3/2015 |
| WO | WO 2015/113301 A1 | 8/2015 |
| WO | WO 2015/148278 A1 | 10/2015 |
| WO | WO 2015/159133 A1 | 10/2015 |
| WO | WO 2015/164253 A1 | 10/2015 |
| WO | WO 2015/175338 A1 | 11/2015 |
| WO | WO 2016/004266 A2 | 1/2016 |

OTHER PUBLICATIONS

Notice of Allowance for U.S. Appl. No. 16/009,006 dated Jul. 31, 2019.
Office Action for U.S. Appl. No. 15/074,425 dated Nov. 27, 2018.
Office Action for U.S. Appl. No. 15/188,423 dated Oct. 30, 2018.
Office Action for U.S. Appl. No. 16/009,006 dated Dec. 3, 2018.
Alawneh et al., "Pattern Recognition Techniques Applied to the Abstraction of Traces of Inter-Process Communication," Software Maintenance and Reengineering (CSMR), 2011 15th European Conference on Year: 2011, IEEE Conference Publications, pp. 211-220, (2011).
Andre et al., "From Visual Data to Multimedia Presentations," Grounding Representations: Integration of Sensory Information in Natural Language Processing, Artificial Intelligence and Neural networks, IEE Colloquium on, pp. 1-3, (1995).
Andre et al., "Natural Language Access to Visual Data: Dealing with Space and Movement," Report 63, German Research Center for Artificial Intelligence (DFKI) SFB 314, Project VITRA, pp. 1-21, (1989).
Barzilay et al.; "Aggregation via Set Partitioning for Natural Language Generation", Proceedings of the Human Language Technology Conference of the North American Chapter of the ACL; pp. 359-366; (2006).
Bhoedjang et al., "Optimizing Distributed Data Structures Using Application-Specific Network Interface Software," Parallel Processing, Proceedings; International Conference on Year: 1998, IEEE Conference Publications, pp. 485-492, (1998).
Cappozzo et al., "Surface-Marker Cluster Design Criteria for 3-D Bone Movement Reconstruction," IEEE Transactions on Biomedical Engineering, 44(12):1165-1174, (1997).
Dalianis et al.; "Aggregation in Natural Language Generation;" Trends in Natural Language Generation, an Artificial Intelligence Perspective; pp. 88-105; (1993).
Dragon et al., "Multi-Scale Clustering of Frame-to-Frame Correspondences for Motion Segmentation," Computer Vision ECCV, Springer Berlin Heidelberg, pp. 445-458, (2012).

Gatt et al.,"From Data to Text in the Neonatal Intensive Care Unit: Using NLG Technology for Decision Support and Information Management," AI Communication, pp. 153-186, (2009).
Gorelov et al., "Search Optimization in Semistructured Databases Using Hierarchy of Document Schemas," Programming and Computer Software, 31(6):321-331, (2005).
Herzog et al., "Combining Alternatives in the Multimedia Presentation of Decision Support Information for Real-Time Control," IFIP, 15 pages,(1998).
Kojima et al., "Generating Natural Language Description of Human Behavior from Video Images," IEEE, pp. 728-731, (2000).
Kottke et al., "Motion Estimation via Cluster Matching," 8180 IEEE Transactions on Pattern Analysis and Machine Intelligence, 16(11):1128-1132, (1994).
Kukich, "Knowledge-Based Report Generation: A Knowledge-Engineering Approach to Natural Language Report Generation," Dissertation to the Interdisciplinary Department of Information Science, University of Pittsburg, 260 pages, (1983).
Leonov et al., "Construction of an Optimal Relational Schema for Storing XML Documents in an RDBMS Without Using DTD/XML Schema," Programming and Computer Software, 30(6):323-336, (2004).
Perry et al., "Automatic Realignment of Data Structures to Improve MPI Performance," Networks (ICN), Ninth International Conference on Year: 2010, IEEE Conference Publications, pp. 42-47, (2010).
Quinlan, "Induction of Decision Trees," Machine Learning, Kluwer Academic Publishers, 1(1):81-106, (1986).
Radev et al.,"Generating Natural Language Summaries from Multiple On-Line Sources," Association of Computational Linguistics, 24(3):469-500, (1998).
Reiter et al., "Building Applied Natural Language Generation Systems," Natural Language Engineering 1 (1), 31 pages, (1995).
Reiter et al.; "Studies in Natural Language Processing—Building Natural Language Generation Systems," Cambridge University Press, (2000).
Reiter, "An Architecture for Data-to-Text Systems," Proceedings of ENLG-2007, pp. 97-104, (2007).
Shaw, "Clause Aggregation Using Linguistic Knowledge;" Proceedings of IWNLG, pp. 138-147, (1998). Retrieved from <http://acl.ldc.upenn.edu/W/W98/W98-1415.pdf>.
Spillner et al., "Algorithms for Dispersed Processing," Utility and Cloud Computing (UC), 204 IEEE/ACM 7th International Conference on Year: 2014, IEEE Conferenced Publications, pp. 914-921, (2014).
Voelz et al., "Rocco: A RoboCup Soccer Commentator System," German Research Center for Artificial Intelligence DFKI GmbH, 11 pages, (1999).
Yu et al., "Choosing the Content of Textual Summaries of Large Time-Series Data Sets," Natural Language Engineering, 13:1-28, (2007).
International Preliminary Report on Patentability for Application No. PCT/IB2012/056513 dated May 19, 2015.
International Preliminary Report on Patentability for Application No. PCT/IB2012/056514 dated May 19, 2015.
International Preliminary Report on Patentability for Application No. PCT/IB2012/057773 dated Jun. 30, 2015.
International Preliminary Report on Patentability for Application No. PCT/IB2012/057774 dated Jun. 30, 2015.
International Preliminary Report on Patentability for Application No. PCT/IB2013/050375 dated Jul. 21, 2015.
International Preliminary Report on Patentability for Application No. PCT/IB2013/058131 dated May 5, 2015.
International Preliminary Report on Patentability for Application No. PCT/IB2014/060846 dated Oct. 18, 2016.
International Preliminary Report on Patentability for Application No. PCT/US2012/053115 dated Mar. 3, 2015.
International Preliminary Report on Patentability for Application No. PCT/US2012/053127 dated Mar. 3, 2015.
International Preliminary Report on Patentability for Application No. PCT/US2012/053128 dated Mar. 3, 2015.
International Preliminary Report on Patentability for Application No. PCT/US2012/053156 dated Mar. 3, 2015.

(56) References Cited

OTHER PUBLICATIONS

International Preliminary Report on Patentability for Application No. PCT/US2012/053183 dated Mar. 3, 2015.
International Preliminary Report on Patentability for Application No. PCT/US2012/061051 dated Mar. 3, 2015.
International Preliminary Report on Patentability for Application No. PCT/US2012/063343 dated May 5, 2015.
International Search Report and Written Opinion for Application No. PCT/IB2012/056513 dated Jun. 26, 2013.
International Search Report and Written Opinion for Application No. PCT/IB2012/056514 dated Jun. 26, 2013.
International Search Report and Written Opinion for Application No. PCT/IB2012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/IB2013/058131 dated Jul. 3, 2014.
International Search Report and Written Opinion for Application No. PCT/IB2014/060846 dated Feb. 4, 2015.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
Notice of Allowance for U.S. Appl. No. 14/023,023 dated Apr. 11, 2014.
Notice of Allowance for U.S. Appl. No. 14/023,056 dated Apr. 29, 2014.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Notice of Allowance for U.S. Appl. No. 14/650,763 dated Jan. 30, 2018.
Notice of Allowance for U.S. Appl. No. 14/650,763 dated Jun. 26, 2018.
Notice of Allowance for U.S. Appl. No. 14/650,777 dated Jan. 30, 2018.
Notice of Allowance for U.S. Appl. No. 15/421,921 dated Mar. 14, 2018.
Office Action for U.S. Appl. No. 14/023,023 dated Mar. 4, 2014.
Office Action for U.S. Appl. No. 14/023,056 dated Nov. 21, 2013.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 14/650,763 dated Dec. 16, 2016.
Office Action for U.S. Appl. No. 14/650,763 dated Sep. 8, 2017.
Office Action for U.S. Appl. No. 14/650,777 dated Mar. 6, 2017.
Office Action for U.S. Appl. No. 14/650,777 dated Sep. 7, 2016.
Office Action for U.S. Appl. No. 15/074,425 dated Feb. 26, 2018.
Office Action for U.S. Appl. No. 15/074,425 dated May 10, 2017.
Office Action for U.S. Appl. No. 15/188,423 dated Jul. 20, 2018.
Office Action for U.S. Appl. No. 15/188,423 dated Oct. 23, 2017.
Office Action for U.S. Appl. No. 15/421,921 dated Sep. 27, 2017.
Statement in accordance with the Notice from the European patent Office dated Oct. 1, 2007 concerning business methods (OJ EPO Nov. 2007, 592-593, (XP002456414) 1 page.
U.S. Appl. No. 12/779,636; entitled "System and Method for Using Data to Automatically Generate a Narrative Story" filed May 13, 2010.
U.S. Appl. No. 13/186,308; entitled "Method and Apparatus for Triggering the Automatic Generation of Narratives" filed Jul. 19, 2011.
U.S. Appl. No. 13/186,329; entitled "Method and Apparatus for Triggering the Automatic Generation of Narratives" filed Jul. 19, 2011.
U.S. Appl. No. 13/186,337; entitled "Method and Apparatus for Triggering the Automatic Generation of Narratives" filed Jul. 19, 2011.
U.S. Appl. No. 13/186,346; entitled "Method and Apparatus for Triggering the Automatic Generation of Narratives" filed Jul. 19, 2011.
U.S. Appl. No. 13/464,635; entitled "Use of Tools and Abstraction in a Configurable and Portable System for Generating Narratives" filed May 4, 2012.
U.S. Appl. No. 13/464,675; entitled "Configurable and Portable System for Generating Narratives" filed May 4, 2012.
U.S. Appl. No. 13/464,716; entitled "Configurable and Portable System for Generating Narratives" filed May 4, 2012.
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,684; entitled "Method, Apparatus, and Computer Program Product for User-Directed Reporting;" filed Sep. 16, 2013.
U.S. Appl. No. 14/027,775; entitled "Method and Apparatus for Interactive Reports;" filed Sep. 16, 2013.
U.S. Appl. No. 14/311,806; entitled Method and Apparatus for Alert Validation; In re: Reiter, filed Jun. 23, 2014.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/650,763; entitled "Method and Apparatus for Motion Detection;" filed Jun. 9, 2015.
U.S. Appl. No. 14/914,461, filed Feb. 25, 2016; In re: Reiter et al., entitled Text Generation From Correlated Alerts.
U.S. Appl. No. 15/022,420, filed Mar. 16, 2016; In re: Mahamood, entitled Method and Apparatus for Document Planning.
U.S. Appl. No. 15/074,425, filed Mar. 18, 2016; In re: Reiter, entitled Method and Apparatus for Situational Analysis Text Generation.
U.S. Appl. No. 15/093,337, filed Apr. 7, 2016; In re: Reiter, entitled Method and Apparatus for Referring Expression Generation.
U.S. Appl. No. 15/093,365, filed Apr. 7, 2016; In re: Logan et al., entitled Method and Apparatus for Updating a Previously Generated Text.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.

* cited by examiner

METHOD AND APPARATUS FOR MOTION DETECTION

CROSS-REFERENCE TO RELATED APPLICATIONS

The present application is a continuation of U.S. application Ser. No. 14/650,763, titled "METHOD AND APPARATUS FOR MOTION DETECTION," filed Jun. 9, 2015, which is a National Phase Entry of International Application No. PCT/IB2012/057773, titled "METHOD AND APPARATUS FOR MOTION DETECTION," filed Dec. 27, 2012, the contents of which are hereby incorporated by reference herein in their entirety.

TECHNOLOGICAL FIELD

Embodiments of the present invention relate generally to natural language generation technologies and, more particularly, relate to a method, apparatus, and computer program product for motion detection.

BACKGROUND

Advances in computer processor speeds and other performance characteristics have occurred at a rapid pace in recent history, to the point that many human behaviors can now be thoroughly mimicked by machines. However, it has become apparent that current technology is insufficient for replication of certain activities. For example, the human brain tends to be quite adept at extracting data and drawing inferences and conclusions from complex sets of data. These inferences and conclusions may be used to describe the data in a way that allows another human to easily understand important events that occur in the data set. One such task that employs these reasoning faculties is the use of language to describe events in a concise, natural manner.

In an effort to enable computers and other machines to communicate data in a similar manner to human beings, example embodiments of the invention relate to Natural Language Generation (NLG) systems. These NLG systems function to parse data sets and to identify features within the dataset for communication to users, customers, other computer systems, or the like by expressing the features in a linguistic format. In some examples, a NLG system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index. For example, "securities markets rose steadily through most of the morning, before sliding downhill late in the day."

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

In some examples, an NLG system may be configured to linguistically express a certain type of data. For example, the NLG system may be configured to describe sports statistics, financial data, weather data, or the like using terminology and linguistic expressions appropriate for the data set. Different terminology, phraseology, idioms, and the like may be used to describe different types of phenomena, and different data domains may require different analysis techniques for efficient generation of linguistic output. For example, an analysis operation for a set of sports data to generate a game recap may require different data analysis techniques than analysis of weather data to generate a weather forecast.

In some examples, input data may not be provided in a format that is readily usable for generation of natural language. In many cases, the NLG system may not be aware of how to extract relevant data from input sources that a human user can readily process. For example, it may be more straightforward for an NLG system to create a baseball game recap from a set of box score data than from a video replay of the game. In order to allow the NLG system to create the natural language recap, the data must be presented in a format that allows the NLG system to identify important relationships and relevant details among the data. One use case that presents such a challenge is a set of data related to object position over time. When presented with a set of raw image data describing the location of objects, current NLG systems are unable to detect relevant features of the location data that might be obvious to a human viewer.

BRIEF SUMMARY

Some example embodiments of a computer system may relate to detection of motion among a given set of data. Example embodiments may provide for identification of attributes of interest spatially located within a sequence of spatial data frames. The attributes of interest may be clustered and examined across frames of the spatial data to detect motion vectors. The system may then derive information about these clustered attributes of interest and their motion over time and identify moving and/or static objects, and the moving and/or static objects may be used to generate natural language messages describing the motion of the attributes of interest. For example, weather data may be provided as a set of precipitation data, where the data corresponds to a series of snapshots of precipitation recorded or predicted at a set of locations in a geographical region at a particular set of times. Example NLG systems may analyse the precipitation data to identify weather fronts or other features relevant to creating a weather report. Other example uses include description of oil spills, cellular growth (e.g., tumor progression), atmospheric conditions (e.g., the size of a hole in the ozone layer), or any other implementation where it may be desirable to detect motion vectors in a sequence of spatial data frames.

Methods, apparatuses, and computer program products are described herein that are configured to detect motion. Embodiments of the invention may provide a method for detecting motion. The method may include determining the location of one or more clusters in a sequence of spatial data frames at two or more of a plurality of time values. The sequence of spatial data frames may define one or more locations of the one or more clusters at the plurality of time values. The method may further include determining that a first cluster of the one or more clusters in a first of the two or more time values corresponds to a second cluster of the one or more clusters in a second of the two or more time values. The method may also include determining at least one motion vector between the first cluster and the second cluster, and determining, using a processor, a moving object based on information comprising the at least one motion vector.

Embodiments may further include an apparatus configured to detect motion. The apparatus may include a memory coupled to at least one processor. The processor may be configured to determine the location of one or more clusters in a sequence of spatial data frames at two or more of a plurality of time values. The sequence of spatial data frames may define one or more locations of the one or more clusters at the plurality of time values. The processor may be further configured to determine that a first cluster of the one or more clusters in a first of the two or more time values corresponds to a second cluster of the one or more clusters in a second of the two or more time values, determine at least one motion vector between the first cluster and the second cluster, and determine a moving object based on information comprising the at least one motion vector.

Yet further embodiments may provide a computer readable storage medium comprising instructions that, when executed by a processor, cause the processor to perform a method for detecting motion. The instructions may configure the processor to determine the location of one or more clusters in a sequence of spatial data frames at two or more of a plurality of time values. The sequence of spatial data frames may define one or more locations of the one or more clusters at the plurality of time values. The instructions may further configure the processor to determine that a first cluster of the one or more clusters in a first of the two or more time values corresponds to a second cluster of the one or more clusters in a second of the two or more time values, determine at least one motion vector between the first cluster and the second cluster, and determine a moving object based on information comprising the at least one motion vector.

BRIEF DESCRIPTION OF THE DRAWINGS

Figure 1:
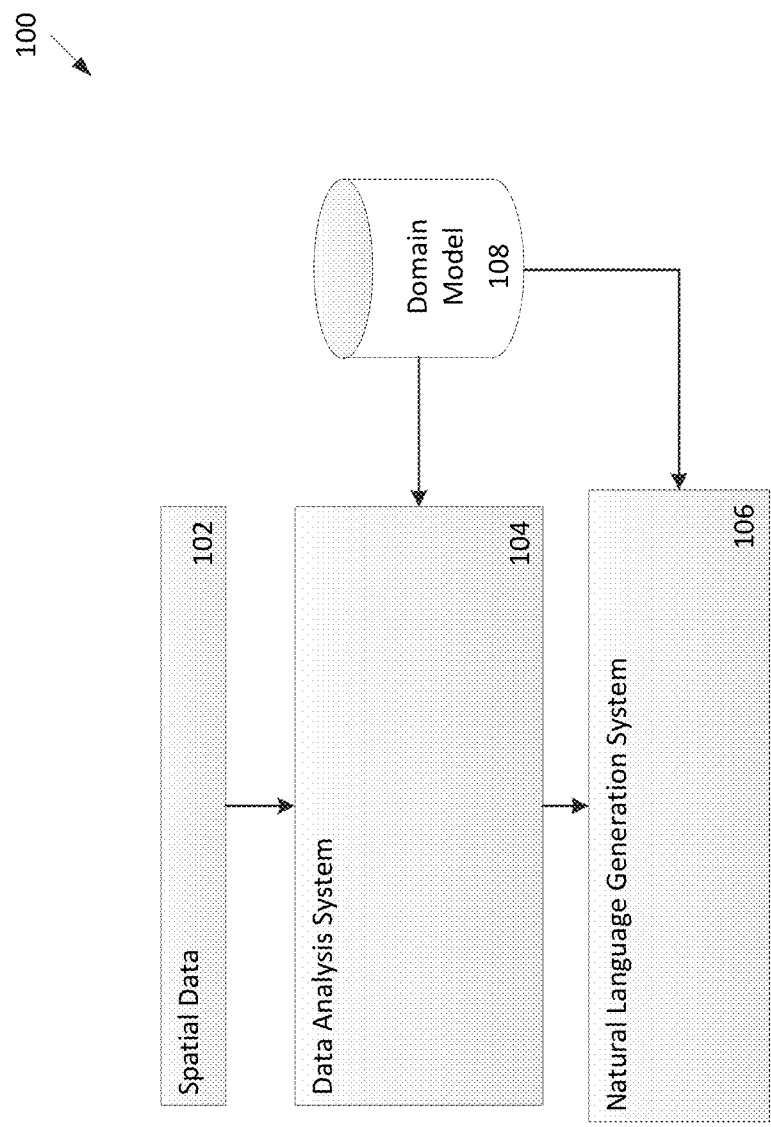
Figure 2:
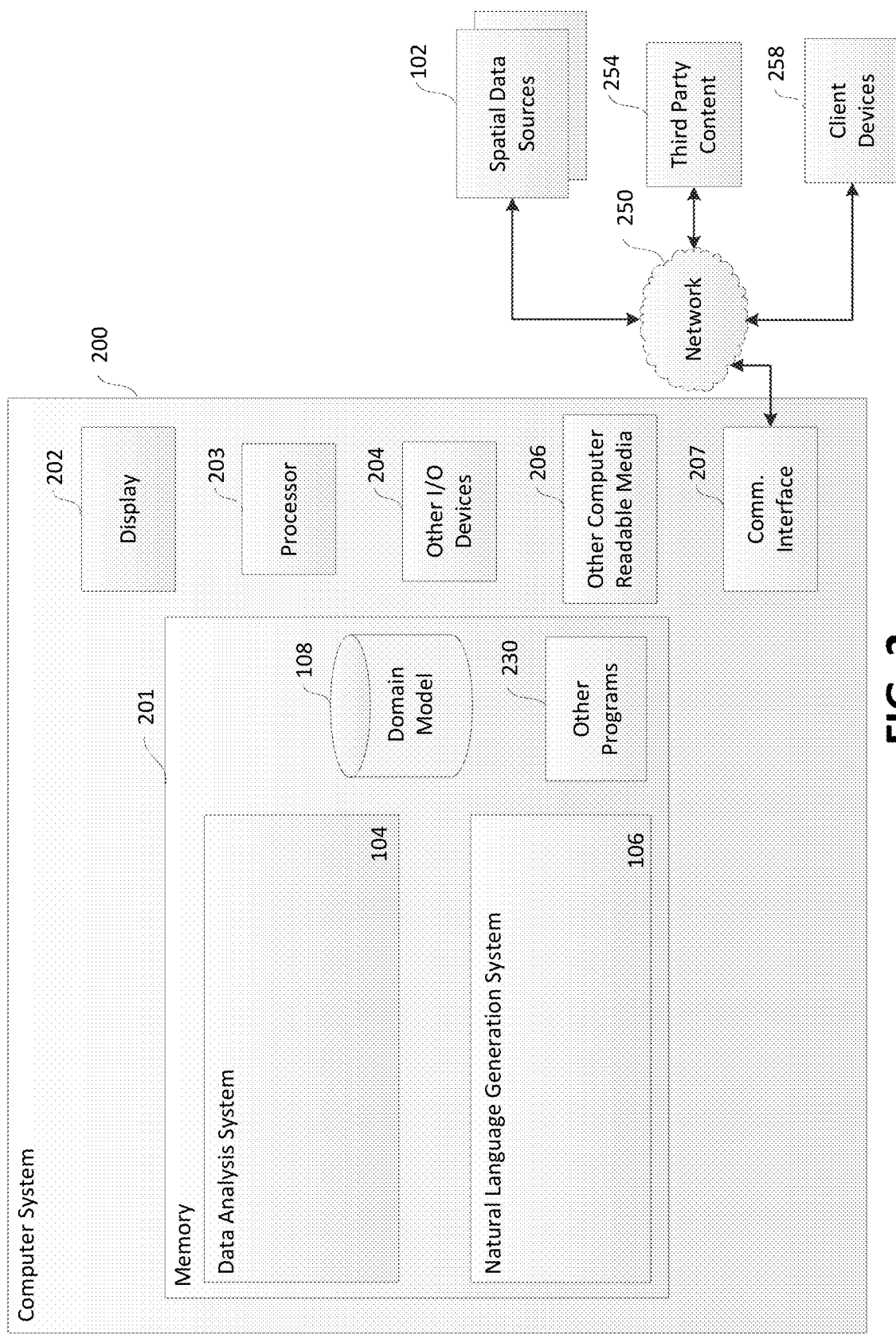
Figure 3:
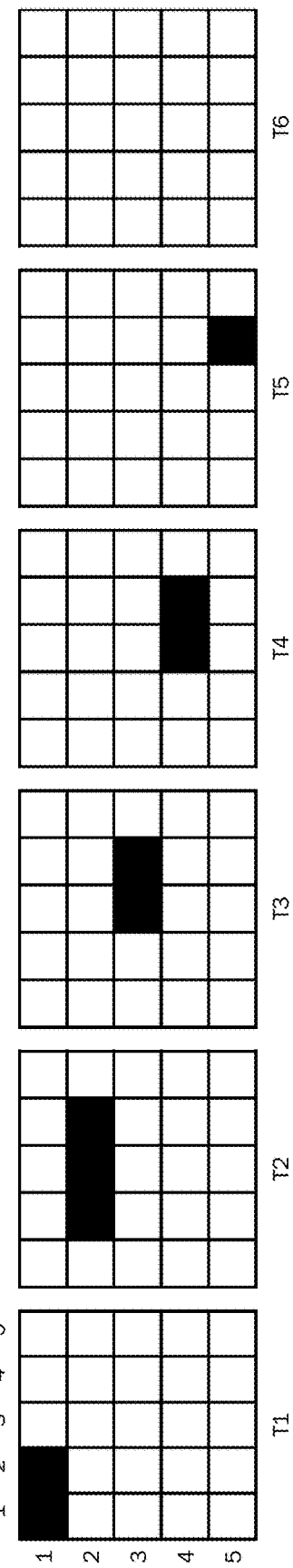

Having thus described embodiments of the invention in general terms, reference will now be made to the accompanying drawings, which are not necessarily drawn to scale, and wherein:

FIG. 1 is a schematic representation of a motion detection and analysis system in accordance with some example embodiments of the present invention;

FIG. 2 illustrates a block diagram of an apparatus that embodies a motion detection and analysis system in accordance with some example embodiments of the present invention;

FIG. 3 illustrates an example sequence of spatial data frames from which object motion may be detected in accordance with some example embodiments of the present invention; and FIGS. 4-9 are flowchart depictions of example methods that may be performed by a motion detection and analysis system in accordance with some example embodiments of the present invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

One of the primary factors that users generally consider in the analysis of spatio-temporal data is the concept of motion. The relative position of attributes of interest over time can help a user determine where the attributes of interest has been, where it is going, how fast it will get there, and other relevant data. From biology to chemistry to physics to meteorology, the movement of attributes of interest within a system can provide valuable information about the system and the attributes of interest within it.

In order to assist a user with interpretation of spatial data over time, a set of text describing the motion of attributes of interest within the system may be generated by a motion detection and analysis system as described herein. For example, precipitation data for a weather system may be analyzed to identify the movement of the precipitation system, and a weather forecast may be generated based on the movement information. Although example embodiments are described with respect to meteorological applications, the systems, apparatuses, methods, and computer products described herein could be equally applicable to analysis and text generation for any sequence of spatial data frames.

A motion detection and analysis system provided according to embodiments of the invention may be operable to identify motion among a sequence of spatial data frames, to determine one or more motion vectors of attributes of interest within the spatial data, and to identify motion vector types and other information about the attributes of interest based on the determined motion vectors.

Spatial data may be mapped onto or otherwise represented in terms of a geometric grid, such that one or more attributes of interest may be identified or otherwise captured as it moves across multiple frames of the geometric grid. In the present context, the term "frame" refers to a representation of the geometric grid at a particular time reference. Each frame may include a collection of locations that are uniquely addressable via an indexing system (e.g., a coordinate grid, with the location of attributes of interest represented by values associated with particular coordinates). The term "attribute of interest" may be used to describe data that indicates the presence or lack of a data item at a particular location. Frames may depict attributes of interest as binary values (e.g., either an attribute of interest is or is not present at a particular coordinate set), or as real-number values (e.g., attributes of interest are represented by real number values at particular coordinates). In the case of real-number value representations, the real-number may refer to an amount or other variable associated with the attribute of interest. For example, precipitation data may be associated with real-number values describing the amount of precipitation at the particular location.

The term "cluster" may refer to a collection of locations of attributes of interest in a frame that form a larger identifiable entity. For example, attributes of interest at adjacent locations in a single frame may be combined to form a single cluster. Although clusters may be contiguous, this is not necessarily the case, as clusters may be determined based on a particular threshold proximity between attributes of interest (e.g., within 2 units), or based on common proximate movement vectors (e.g., two attributes of interest that are within a threshold number of units across two or more frames). Although the term "cluster" as used in the instant examples is described as related to a plurality of attributes of interest, the term may also be understood related to a single attribute of interest (e.g., a point location).

The term "motion vector" may refer to a set of values that describe a transition between two clusters in successive frames. The motion vector may include a direction of the transition, a speed of the transition, and a domain-dependent label describing the transition type (e.g., spreading or receding, for a precipitation system, metastasizing for a tumor, etc.). The direction of the transition may be specified by a cardinal direction (e.g., North, South, East, West), as an angle in degrees or radians, or by any other method of expressing direction. The speed may be expressed as an integer or real-number representing a magnitude of the vector.

The term "moving object" in the context of objects detected in a sequence of spatial data frames may refer to a cluster that persists across a sequence of one or more frames. Although the objects are generally described as being detected in a "sequence" of spatial data frames, alternative embodiments may exist where analyzed frames are not presented in a linear sequence or as successive frames. For example, every other frame of a sequence of frames may analyzed to reduce the amount of processing resources required to review the data, or the first and last frames may be analyzed with selected frames in between. As such, the term "sequence of spatial data frames" should be understood to also refer to these alternative embodiments where the spatial data frames is not associated with successive frames. The moving object may be related to a sequence of one or more motion vectors derived from the spatial data frames. The cluster associated with the moving object may change location, shape, and/or size from one frame to the next. If a cluster persists across multiple frames with no change, then the cluster may be identified as a "static object" instead of as a moving object.

Moving objects and static objects may be characterized as "domain events" and "domain states", respectively by attaching domain-specific cluster motion types (e.g., "spreading", "receding", or "a band of precipitation" for a weather domain, "gridlock", "stop-and-go", or "congested" for a traffic domain, or the like) to the respective object. Cluster motion types may be assigned to moving and static objects based on the cluster motion types of the motion vectors associated with the objects. Where the constituent motion vectors do not correspond to a simple domain event, the domain event may be classified as a "hybrid movement." In order to express computed domain events and states linguistically by an NLG system, the domain specific cluster motion types may be analyzed to ensure that the domain specific cluster motion types fit into a language friendly ontology of domain events and states. As such, the computed domain events and states may be identified as linguistically describable using words and phrases from the sublanguage used in a specific domain (e.g. a sublanguage for weather reports). This process is particularly relevant to the field of natural language generation, as other techniques for identifying the motion of objects are not concerned with linguistic expressions of said motion. For example, a robot may be fitted with a computer vision module to drive a vehicle in real-world traffic. Such a robot might compute motion events and states which may not be describable in language, as driving the vehicle is the objective of this robot, but describing the other moving vehicles in linguistic terms is not.

FIG. 1 is an example block diagram of example components of an example motion detection and analysis environment 100. In some example embodiments, the motion detection and analysis environment 100 comprise a data analysis system 104, a natural language generation system 106 and one or more data sources, such as but not limited to, a sequence of spatial data frames 102, and/or a domain model 108. The data analysis system 104, and/or the natural language generation system 106 make take the form of, for example, a code module, a component, circuitry and/or the like. The components of the motion detection and analysis environment 100 are configured to provide various logic (e.g. code, instructions, functions, routines and/or the like) and/or services related to the motion detection and analysis system.

In some example embodiments a sequence of spatial data frames 102 includes spatial data received from an external source, such as from one or more sensors or remote computers. For example, the sequence of spatial data frames 102 may include information that describes the position of one or more attributes of interest over time (e.g., over a plurality of frames). The sequence of spatial data frames 102 includes data that may be used in the motion detection and analysis environment 100 to detect motion. Example sources of spatial data frames might include weather data (e.g., a weather radar display, numerical weather prediction data from atmospheric simulation models, etc.), traffic data (e.g., areas of automobile congestion on a street map), scientific data (e.g., growth of cells in a petri dish), medical data (e.g., analysis of an electrocardiograph wave form), or network data (e.g., a representation of bandwidth in a network).

The sequence of spatial data frames 102 may in some example embodiments be received via data communication with one or more sensors, monitoring systems, storage devices, computing nodes, and/or the like. In examples in which the sequence of spatial data frames 102 is received from a monitoring system or a sensor, the sequence of spatial data frames 102 may be provided in a format that includes and/or is representable by one or more images.

The sequence of spatial data frames 102 may include data such as, but not limited to, data that indicates variation across location (e.g. rainfall in different regions), or spatial-temporal data that combines both time series data and spatial data (e.g. rainfall across time in different geographical output areas). The data contained or otherwise made accessible by the sequence of spatial data frames 102 may be provided in the form of numeric values (e.g., coordinate values) for specific parameters across time and space, but the raw input data may also contain alphanumeric symbols, such as the RDF notation used in the semantic web, or as the content of database fields. The data may be received from a plurality of sources and, as such, data received from each source, sub source or data that is otherwise related may be grouped into or otherwise referred to as the sequence of spatial data frames 102. An example of the sequence of spatial data frames 102 is described further below with respect to FIG. 3.

The data analysis system 104 may identify motion of one or more attributes of interest in the sequence of spatial data frames 102 to detect moving and static objects. The data analysis system 104 may perform a frame-by-frame analysis of a series of attributes of interest (e.g., spatial data provided over time as one or more frames). The terms "frame" and "frames" are used to describe sets of data that share a particular temporal characteristic; it should be readily understood that the term is not intended to apply only to frames as known in video or other moving spatial data formats (e.g., GIF, PNG, etc.), but rather any set of data formatted according to a temporal characteristic such that motion characteristics may be identified over a period of time. The frames could also be sequenced based on any indexing scheme not necessarily time. The data analysis system 104 may identify a series of clusters in the sequence of spatial data frames 102, and derive motion vectors. The data analysis system 104 may further give domain-specific labels to moving and static object identified from a sequence of one or more motion vectors to assist a natural language generation system 106 with linguistically describing the moving and static objects. For example, moving objects that move according to a certain motion vector in a weather domain may be associated with different labels than moving objects that move according to the same motion vector in a medical domain, as terminology for describing weather moving objects may not be appropriate for describing medical objects (e.g., cells). Example methods for identifying motion vectors from the spatial data as may be employed by the data analysis system 104 are described further below with respect to FIGS. 4-9.

The moving and static objects detected by the data analysis system 104 may be used by a natural language generation system 106 to generate one or more messages describing the objects and motion vectors. Messages are language independent data structures that correspond to informational elements in a text and/or collect together underlying data, referred to as slots, arguments or features, which can be presented within a fragment of natural language such as a phrase or sentence. A message typically corresponds to a fact about the underlying data (for example, the existence of some observed event) that could be expressed via a simple sentence (although it may ultimately be realized by some other linguistic means). One such natural language generation system is described in Building Natural Language Generation Systems by Ehud Reiter and Robert Dale, Cambridge University Press (2000), which is incorporated by reference in its entirety herein.

FIG. 2 is an example block diagram of an example computing device for practicing embodiments of an example motion detection and analysis system. In particular, FIG. 2 shows a computing system 200 that may be utilized to implement a motion detection and analysis environment 100 having a sequence of spatial data frames 102; a data analysis system 104; a natural language generation system 106; and/or an optional user interface (not shown). One or more general purpose or special purpose computing systems/devices may be used to implement the data analysis system 104, and/or the natural language generation system 106. In addition, the computing system 200 may comprise one or more distinct computing systems/devices and may span distributed locations. In some example embodiments, the data analysis system 104, and/or the natural language generation system 106 may be configured to operate remotely via the network 250. In some example embodiments, a pre-processing module or other module that requires heavy computational load may be configured to perform that computational load and thus may be on a remote device or server. For example, the data analysis system 104 may be accessed remotely. Furthermore, each block shown may represent one or more such blocks as appropriate to a specific example embodiment. In some cases one or more of the blocks may be combined with other blocks. Also, the data analysis system 104, and/or the natural language generation system 106 may be implemented in software, hardware, firmware, or in some combination to achieve the capabilities described herein.

In the example embodiment shown, computing system 200 comprises a computer memory ("memory") 201, a display 202, one or more processors 203, input/output devices 204 (e.g., keyboard, mouse, CRT or LCD display, touch screen, gesture sensing device and/or the like), other computer-readable media 205, and communications interface 206. The processor 203 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 2 as a single processor, in some embodiments the processor 203 comprises a plurality of processors. The plurality of processors may be in operative communication with each other and may be collectively configured to perform one or more functionalities of the motion detection and analysis system as described herein.

The data analysis system 104, and/or the natural language generation system 106 are shown residing in memory 201. The memory 201 may comprise, for example, transitory and/or non-transitory memory, such as volatile memory, non-volatile memory, or some combination thereof. Although illustrated in FIG. 2 as a single memory, the memory 201 may comprise a plurality of memories. The plurality of memories may be embodied on a single computing device or may be distributed across a plurality of computing devices collectively configured to function as the motion detection and analysis system. In various example embodiments, the memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the data analysis system 104, and/or the natural language generation system 106 may be stored on and/or transmitted over the other computer-readable media 205. The components of the data analysis system 104, and/or the natural language generation system 106 preferably execute on one or more processors 203 and are configured to generate natural language describing moving and/or static objects derived from spatial data, as described herein.

Alternatively or additionally, other code or programs 230 (e.g., an administrative interface, a Web server, and the like) and potentially other data repositories, such as data repository 240, also reside in the memory 201, and preferably execute on one or more processors 203. Of note, one or more of the components in FIG. 2 may not be present in any specific implementation. For example, some embodiments may not provide other computer readable media 205 or a display 202.

The data analysis system 104, and/or the natural language generation system 106 are further configured to provide functions such as those described with reference to FIG. 1. The data analysis system 104, and/or the natural language generation system 106 may interact with the network 250, via the communications interface 206, with the sequence of spatial data frames 102, (e.g. remote reference data, remote performance data, remote aggregation data, remote sensors and/or the like), third-party content providers 254 and/or client devices 258. The network 250 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 250 may take the form of the internet or may be embodied by a cellular network such as an LTE based network. In this regard, the communications interface 206 may be capable of operating with one or more air interface standards, communication protocols, modulation types, access types, and/or the like. The client devices 258 include desktop computing systems, notebook computers, mobile phones, smart phones, personal digital assistants, tablets and/or the like.

In an example embodiment, components/modules of the data analysis system 104, and/or the natural language generation system 106 are implemented using standard programming techniques. For example, the data analysis system 104 and/or the natural language generation system 106 may be implemented as a "native" executable running on the processor 203, along with one or more static or dynamic libraries. In other embodiments, the data analysis system 104, and/or the natural language generation system 106 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the data analysis system 104, and/or the natural language generation system 106, such as by using one or more application programming interfaces can be made available by mechanisms such as through application programming interfaces (API) (e.g. C, C++, C #, and Java); libraries for accessing files, databases, or other data repositories; through scripting languages such as XML; or through Web servers, FTP servers, or other types of servers providing access to stored data. The sequence of spatial data frames 102 and the domain model 108 may be implemented as one or more database systems, file systems, or any other technique for storing such information, or any combination of the above, including implementations using distributed computing techniques. Alternatively or additionally, the sequence of spatial data frames 102 and the domain model 108 may be local data stores but may also be configured to access data from one or more remote sources.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the sequence of spatial data frames 102, the data analysis system 104, and/or the natural language generation system 106 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIG. 3 illustrates an example sequence of spatial data frames from which motion and/or static objects may be detected. The sequence of spatial data frames may be received in a grid-based coordinate format as depicted in FIG. 3, or the grid representation may be overlaid on the sequence of spatial data frames by a computing system, such as computing system 200, prior to motion detection. For example, the sequence of spatial data frames may be received as an image or set of images, and post-processing may be performed to divide the image into a grid representation. Additionally or alternatively, pixels of an image may be used to define the grid. In some embodiments, the sequence of spatial data frames may be received as numerical data or in a random access file format. In cases where the sequence of spatial data frames is not associated with an image, the sequence of spatial data frames may be converted into an array or grid format for analysis, such that the spatial data may be represented as an image or set of images for analysis. In some examples, color values, intensity values or the like may be used to represent the presence of an attribute of interest as well as its relative intensity. In the present example, a sequence of spatial data frames has been divided into series of frames, where each frame is represented by a 5×5 grid. Time values T1-T6 represent a particular location over a period of time.

At time T1, the depicted frame includes clusters defined by attributes of interest at locations (1,1) and (2,1). At time T2, the clusters (and thus their component associated attributes of interest) move to locations (2, 2), (3,2), and (4,2). As can be readily discerned from the example, clusters may change in size and shape in addition to changing screen location. At time T3, the clusters move to locations (3,3) and (4,3), to locations (3,4) and (4,4) at time T4, and location (4, 5) at time T5. The clusters have left the frame at T5. The instant set of frames depicts attributes of interest in a binary manner (e.g., a given coordinate location either has an attribute of interest or it does not) but, as described above, a frame may also have real-number values at various locations. For example, a given location might be associated with values ranging from 0 to 1, from 0 to 10, from 0 to 100, or any other range. In some embodiments, each location may be associated with a value, and a filter may be provided to detect attributes of interest and/or clusters (e.g., a Kalman filter). Additionally or alternatively, one or more thresholds may be used to detect attributes of interest, such that attributes of interest are indicated at locations where the value exceeds a particular threshold.

Although the instant example depicts a square grid covering the entire frame, embodiments may also relate to irregular frame sizes. For example, a sequence of spatial data frames may correspond to a geographical area, with a grid defined solely for locations that have dry land, when preparing a weather report, or various other limitations may be imposed upon the grid based on desired output information. By constraining the grid in this manner, less area is analyzed, thus potentially improving the speed and efficiency of the motion detection operations.

FIGS. 4-9 illustrate example flowcharts of the operations performed by an apparatus, such as computing system 200 of FIG. 2, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 201 of an apparatus employing an embodiment of the present invention and executed by a processor 203 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s).

The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4-9, when executed, convert a computer or processing circuitry into a particular machine configured to perform an example embodiment of the present invention. Accordingly, the operations of FIGS. 4-9 define an algorithm for configuring a computer or processor, to perform an example embodiment. In some cases, a general purpose computer may be provided with an instance of the processor which performs the algorithms of FIGS. 4-9 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

Figure 4:
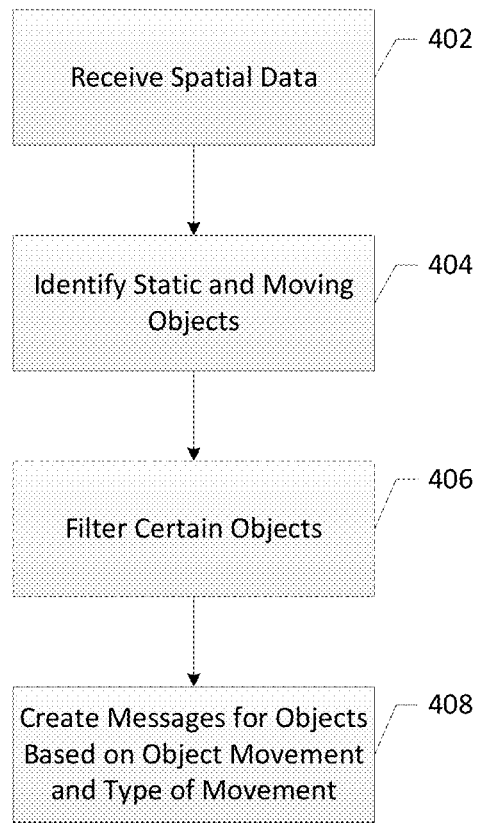

FIG. 4 is a flow chart depicting a method 400 for detecting motion using a spatial data set in accordance with example embodiments of the present invention. The method 400 receives a sequence of spatial data frames depicting locations over a period of time, such as in a plurality of frames. For example, the method 400 may be performed by a data analysis system 104 as described above with respect to FIGS. 1 and 2. The method 400 identifies one or more attributes of interest within the frames, and determines the relative position of attributes of interest and clusters of attributes of interest across the plurality of frames. Motion vectors are derived from these relative positions. The method 400 further identifies moving and/or static objects based on the derived motion vectors. Based on the types of motion detected, the method 400 may create messages that are operable to provide a linguistic description of the identified moving and/or static objects. For example, the method 400 may associate moving and/or static objects with particular domain-specific identifiers that may be used by a natural language generation system, such as the natural language generation system 106, to generate natural language output describing the moving and/or static objects.

At action 402, the method 400 receives a sequence of spatial data frames. As described above with respect to FIG. 1, the sequence of spatial data frames may be received from one or more sensors or external devices, or the sequence of spatial data frames may be locally stored on the computing device executing the method 400. The sequence of spatial data frames may include a series of frames, each of which depict a set of locations and/or attributes of interest at certain times. The frames of the spatial data may correspond to a single set of locations, such that each frame depicts the same location or set of locations. Alternatively, in some embodiments the spatial data may include an absolute coordinate reference system so that, even though the spatial data depicts different locations, locations may be identified in relative to position to one another.

At action 404, moving and/or static objects are identified within the spatial data. The moving and/or static objects may be identified by detecting attributes of interest in each frame, clustering the attributes of interest, and observing the movement of the clusters across the frames. Example methods for performing the process of detecting moving and/or static objects is described further below with respect to FIGS. 5-9.

At action 406, one or more of the identified moving and/or static objects may optionally be filtered out of the data. For example, static objects (e.g., objects with no associated movement vectors) may be identified as irrelevant to the motion detection process. For example, moving and/or static objects below a certain size or clusters below a certain density may be removed from consideration in the motion detection process. Various other criteria may also be employed for removing moving and/or static objects other than the motion vectors of the objects. For example, in the case of weather data, objects that are not near populated areas in a geographical weather map may be removed from consideration.

At action 408, messages may be created for the remaining moving and/or static objects based on the detected movement vectors and cluster motion types for the clusters associated with the objects. These messages may include conceptual labels that are applied to the identified moving and/or static objects so that they may be appropriately described at a later time. The messages may be created using a domain model that maps identified movement vectors and cluster motion types to terms and messages related to the domain model. These messages may be used in the generation of natural language describing the moving and/or static objects, such as by a natural language generation system 106 as described with respect to FIGS. 1 and 2.

Figure 5:
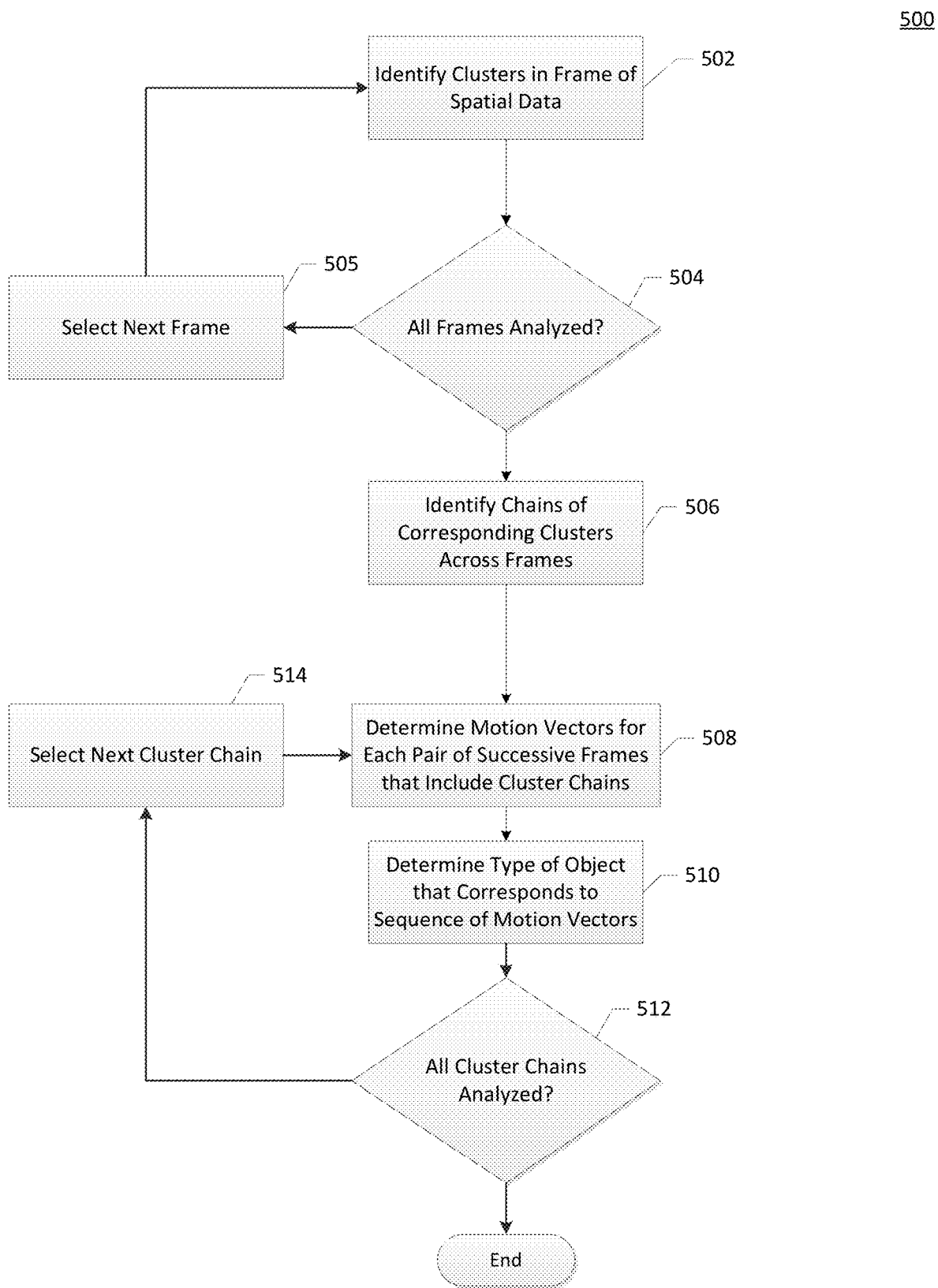

FIG. 5 is a flow chart depicting an example method 500 for identifying objects in a sequence of frames in accordance with embodiments of the invention. The method 500 may be employed to identify objects within a sequence of spatial data frames, such as part of action 404 as described above with respect to FIG. 4. The method 500 may be employed by a data analysis system 104 for the detection of objects as part of a motion detection process.

At action 502, clusters are identified for a given frame of the image. Clusters may be identified by detecting attribute of interest locations that are contiguous or otherwise share relevant values. An example of a method 600 for detecting clusters is described below with respect to FIG. 6. When clusters are detected, the method 500 may store the location and frame of the cluster in a data structure that records the location of clusters for later analysis.

At action 504, a determination is made as to whether all frames of the sequence of spatial data frames have been analyzed for detection of clusters. If all of the frames have been analyzed, the method proceeds to action 506. Otherwise, the method proceeds to action 505 and the next frame is selected for analysis. The method then returns to action 502 to identify clusters in the next unanalyzed frame.

At action 506, chains of corresponding clusters across the sequence of frames are identified. Cluster chains may be identified by comparing the location of clusters in sequential frames. For example, the data structure storing the location of each cluster in each frame may be compared with preceding and succeeding frames to identify similar clusters based on the size, shape, and location of the clusters. An example of a method 700 for identifying cluster chains is described further below with respect to FIG. 7.

At action 508, motion vectors are determined for each pair of successive frames that include cluster chains. These motion vectors may be identified by comparing the location, size, and shape of clusters across the frames in which the cluster chain is present. Where the cluster shapes vary randomly (e.g. precipitation shapes change across frames randomly) cluster comparisons may be based on location and size. Although the frames being compared are described as successive, the frames are not necessarily adjacent. For example, one or more frames may be skipped to conserve processor resources. In other examples, only a portion of the available frames may be analyzed, for example although frames at 60 second intervals may be available, the method may only extract frames at 30 minute intervals to be analyzed. An example of a method 800 for determining motion vectors for a cluster chain is described further below with respect to FIG. 8.

At action 510, a cluster motion type is determined based on the motion vectors determined at action 508. The cluster motion type may refer to a domain-specific value that linguistically describes the motion of the associated object or cluster of objects. This cluster motion type may be used by other processes, such as a natural language generation system. Although the instant example is related to natural language generation, a cluster motion type associated with a moving object could also be used for any other purpose for which defining an object motion might be useful. According to embodiments of the present invention, cluster motion types may be determined to be relevant for natural language generation. An example of a method 900 for determining a cluster motion type is described further below with respect to FIG. 9.

At action 512, a determination is made as to whether additional cluster chains remain for analysis. If additional cluster chains remain, the method proceeds to action 514 to select the next cluster chain for analysis. If no cluster chains remain, the method 500 ends.

Figure 6:
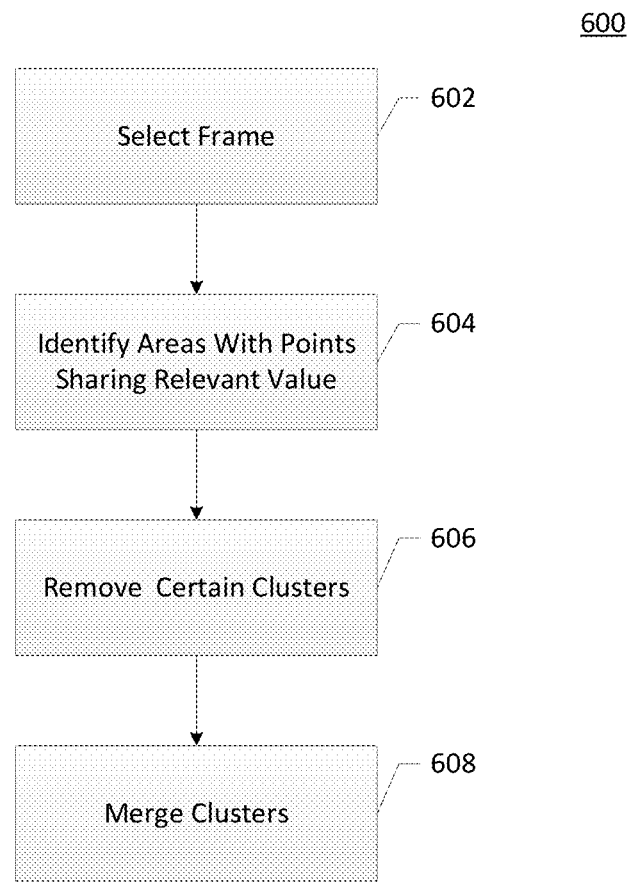

FIG. 6 is a flow chart depicting an example of a method 600 for detecting clusters in accordance with embodiments of the present invention. By clustering related attributes of interest together, additional data may be derived for the motion of the cluster above and beyond that provided by individual pixel or coordinate analysis. For example, clusters may grow or shrink in size, or change shape. In such cases, analysis performed on specific attributes of interest may be insufficient, as those attributes of interest may appear and disappear over time. Identification of clusters also allows for more efficient analysis, as sets of attributes of interest may be associated with a single motion vector at a time, eliminating the need to track a motion vector for each attribute of interest. The method 600 may be employed to identify clusters within a frame from individual attribute of interest values. For example, a series of adjacent attributes of interest may be identified as a single cluster. The method 600 may be employed by a data analysis system, such as the data analysis system 104, as part of a motion detection operation.

At action 602, a frame of spatial data is selected. As described above, the frame may include a set of attributes of interest at a particular point in time. As described with respect to FIG. 6, the method 600 may be applied to each frame in a sequence of spatial data frames to identify clusters in each frame. The example method 500 describes a process for identifying clusters in a single such frame.

At action 604, areas with attributes of interest that share particular values are identified. These points may include contiguous locations (e.g., attributes of interest located at adjacent coordinate locations), or attributes of interest that are within a particular distance of each other. The particular values may be any value that is common to the attributes of interest. For example, in a weather map, attributes of interest with similar precipitation values may be identified.

At action 606, certain clusters may be removed or otherwise ignored from the detection algorithm. For example, clusters that are smaller than a particular size may be removed from consideration.

At action 608, clusters may be merged with one another. For example, clusters may be merged within certain ranges of proximity. The method ends after clusters have been merged, with output of the location of clusters for the analyzed frame. The method 600 may be repeated until clusters are identified for all frames of the sequence of spatial data frames.

Figure 7:
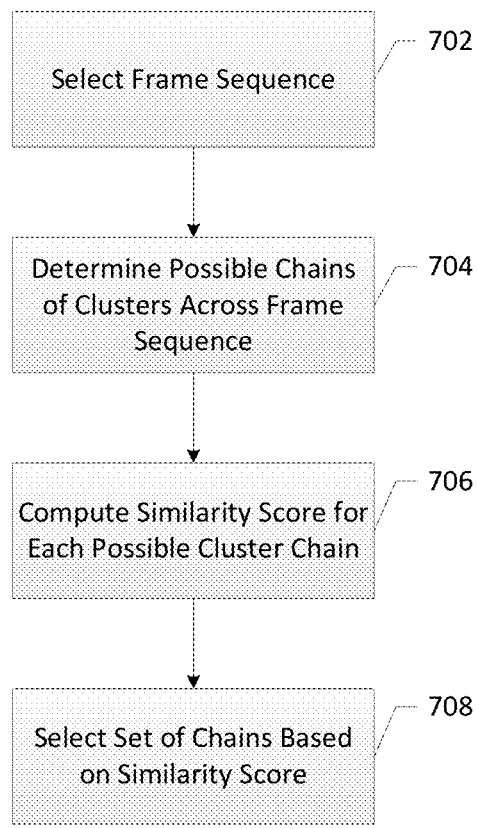

FIG. 7 is a flow chart depicting an example of a method 700 for identifying cluster chains in accordance with embodiments of the present invention. The method 700 may be employed during a motion detection operation to identify changes in cluster positions in successive frames of the sequence of spatial data frames. These changes in position may be used to derive motion vectors of the clusters by comparing the positions of the clusters across the frames connected by the cluster chain. The method 700 may be employed by a data analysis system during a motion detection operation, such as the data analysis system 104.

At action 702, a frame sequence is selected. The frame sequence may include two or more successive frames in a sequence of spatial data frames. For example, the frame sequence may be two sequential frames in the sequence of spatial data frames. In some embodiments, the method 700 is applied to pairs of frames iteratively to identify possible chains across each pair of frames. Alternatively, frames may be analyzed in a recursive manner, with individual frames being analyzed to detect links to object chains identified in other frame pairs. As yet another alternative, frames may be analyzed in groups, and groups analyzed in sequence (e.g., analyzing frame 1 and frame 2 in a sequence together, analyzing frame 3 and frame 4 in a sequence together, and then analyzing the results of frame 1 and 2 with the results of frame 3 and 4 in a sequence).

At action 704, possible chains of clusters are identified across the selected frame sequence. Cluster chains may be identified by comparing the locations of clusters in each frame, and attempting to determine which clusters in the first frame correspond to clusters in the second frame. These similar clusters may be determined by a cluster similarity score for cluster pairs.

At action 706, clusters may be scored for similarity by assigning values for size, shape, and location. For example, clusters that have a similar size, shape, and location may receive a higher score than clusters that deviate in one or more of these characteristics. In some embodiments clusters may change in shape and size from frame to frame. For example, precipitation clusters may change in shape and size from frame to frame. In some embodiments, cluster similarity may be a function of certain domain values. For example, weather system clusters may exhibit different behavior from traffic patterns, as weather clusters (e.g., weather systems) operate according to different movement constraints than traffic objects (e.g., cars). As such, different functions and algorithms may be employed for computation of a similarity score as determined by a domain model, such as the domain model 108 described with respect to FIG. 1. For example, for clusters that change in size and shape form frame to frame without a particular pattern, similarity scores may be calculated based on the ratio of the size of the clusters at a first time frame to the size of the clusters at a second time frame being greater than a threshold value, based on a distance between any two clusters corners being less than a threshold distance across two time frames, based on the average of the distances of any of two corners being less than a threshold distance across two time frames, based on a number of points in the clusters that stay the same across two time frames, or any combination thereof. In some embodiments, different elements may be weighted to produce the similarity score between two clusters.

At action 708, chains may be established by selecting clusters to maximize the similarity score. Various methods of selecting these clusters for linking may be employed. For example, clusters may be selected such that individual pairs of clusters have the highest similarity score, or clusters may be selected for pairing such that a frame similarity score for the entire sequence of frames is maximized. Identified chains may be stored for use in other operations as part of the motion detection process. As described above, the method 700 may be repeated across the frames of data until all frames have been processed by the chain detection method. After initial processing of two or more frames, the method 700 may also be performed on output data, in order to identify chains that span across previously analyzed frames into newly selected frames (e.g. recursive processing). Chains may be stored in a data structure indicating the cluster locations and the frames in which the cluster is present.

Figure 8:
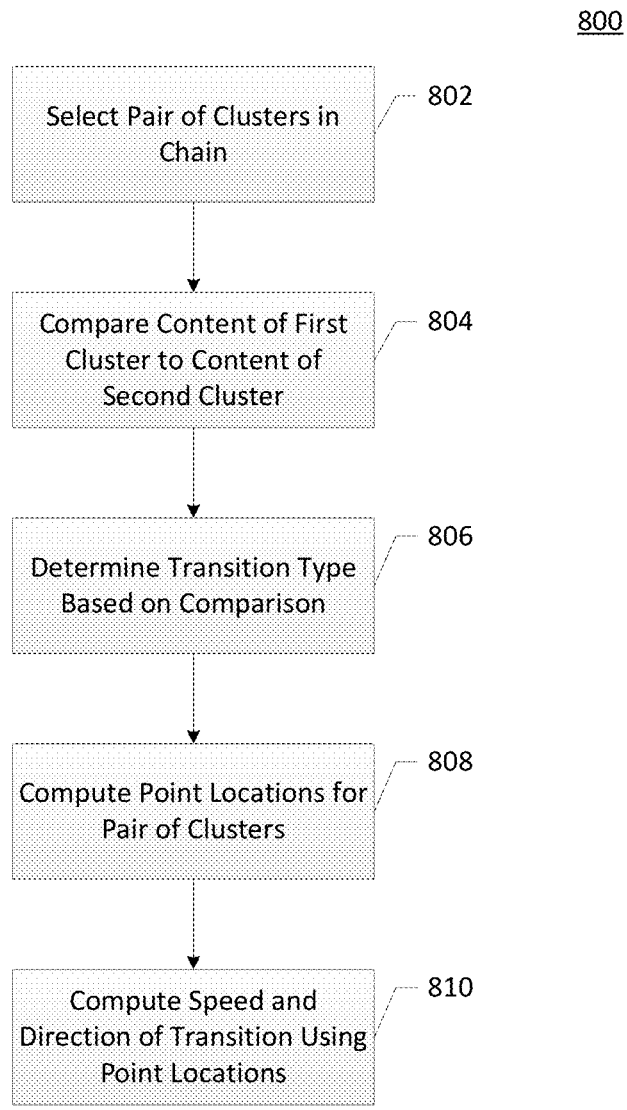

FIG. 8 is a flow chart depicting an example of a method 800 for determining motion vectors for a cluster chain in accordance with example embodiments. Once cluster chains have been identified (e.g., as described with respect to FIG. 7 and the method 700), the location of the clusters may be tracked across the chain. Awareness of these locations may allow for derivation of motion vectors for the clusters. Once the motion vectors are identified, a domain model may be applied to identify domain-specific types, terms, and other knowledge related to the clusters and their motion vectors. These motion vectors and types, terms, and other knowledge may be used to identify the clusters as moving objects or static objects. The method 800 may be employed as part of a motion detection process (e.g., the method 400 described with respect to FIG. 4), as performed by a data analysis system, such as the data analysis system 104.

At action 802, two or more clusters that form a chain across two or more frames are selected. The method 800 may be employed on each set of cluster chains as identified by a method such as the method 700 described above. The method 800 may analyze individual frame pairs of a chain (e.g., pairs of frames from the start frame to the finishing frame), or from the start of the chain to the end (e.g., the first frame and the last frame), or for any other selection of frames of a given cluster chain.

At action 804, the content of the cluster in the first analyzed frame corresponding with the selected cluster frame (e.g., the locations of the cluster in the coordinate system, or the values associated with the locations in the case of clusters defined by real-number values) is compared with the content of the cluster in the second analyzed frame corresponding to the selected cluster frame. The content of the cluster may also include the relative locations of points in the cluster, the density of the cluster, or any other features which may be specified by a domain model established for analysis of the cluster. For example, cluster contents may be identified by creating a list of points at which the cluster exists that were not present in a previous frame, creating a list of points at which the cluster does not exist that were present in the previous frame, and using the two lists to determine a transition type. For example, if the number of points at which the cluster has appeared is less than 20% of the number of points at which the cluster has disappeared and the number of points at which the cluster has disappeared is greater than zero, then the moving object may be identified as "Clearing." If the number of points at which the cluster has disappeared is less than 20% of the number of points at which the cluster has appeared and the number of points at which the cluster has appeared is greater than zero, the moving object may be identified as "Spreading."

At action 806, based on the comparison, a transition type is determined between the two clusters. This transition type may be a generic transition, or it may be a domain-specific transition determined using a domain model. For example, a weather system might be assigned a transition type of "spreading" or "clearing" based on the content of the cluster.

At action 808, a point location, such as a centroid, may be computed for the each cluster in the selected chain. The centroid may be used to establish a central location to all of the points in the cluster. In some embodiments, the centroid may also take into account individual data values of points in the cluster, such as to identify a center of gravity based not only by the locations of points, but also their weight. Alternatively, other values than the centroid may be employed, such as a leading edge, a circumcenter, a barycenter, or the like.

At action 810, the speed and direction of the cluster from the first frame to the second frame is computed using the point locations determined at action 808. The speed of the cluster may be determined by comparing a time value associated with the first frame to a time value associated with the second frame, and computing the distance between the two points, such that the rate equals the distance divided by the change in time. The direction may be determined by the change in coordinates of the points to determine the direction of motion. The method 800 may be repeated across each set of frames across the chain, and the determined motion vectors associated with the object.

Figure 9:
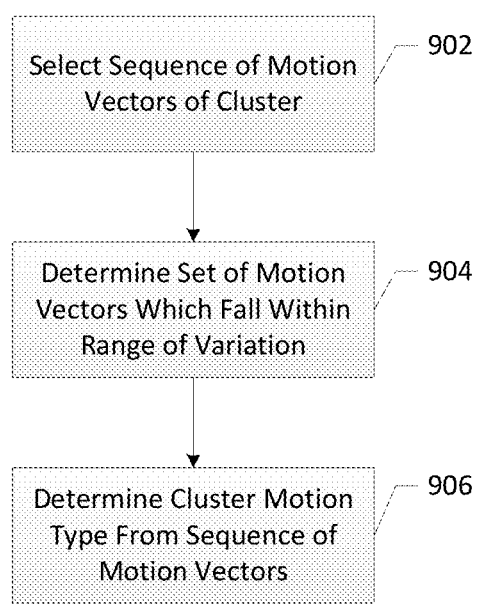

FIG. 9 is a flow diagram depicting an example of a method 900 for determining one or more cluster motion type from a sequence of motion vectors. As described above with respect to FIG. 8, a cluster chain may be associated with one or more motion vectors by analysis of the position of the cluster across the chain. These motion vectors may be used to derive data about the cluster chain, and/or an object associated with the cluster chain based on the direction and magnitude of the motion vectors, along with other location based properties derived from the sequence of spatial data frames (e.g., changes in size, shape, or density of the object over time). The method 900 may be employed on each identified cluster chain that is associated with motion vectors. For example, the method 900 may be employed as part of a motion detection algorithm for associating data (e.g., transition type values) with a sequence of spatial data frames. The method 900 may be performed by a data analysis system, such as the data analysis system 104, during a motion detection operation.

At action 902, a sequence of motion vectors is selected. These motion vectors may represent the output of a method for identifying the motion of a cluster over time, such as the method 800. The method 900 may be performed repeatedly on each cluster chain to identify one or more cluster motion types for each cluster of attributes of interest identified in the spatial data. In some embodiments, the method 900 may be performed multiple times on a single cluster, if the cluster is associated with multiple sequences of motion vectors.

At action 904, motion vectors that fall within an acceptable range of variation are identified. In some embodiments, motion vectors may be combined of smoothed. For example, two identical motion vectors across three frames may be combined into a single motion vector associated with all three frames, or multiple similar but not identical motion vectors may be averaged to reduce computational complexity. A given cluster chain may be associated with multiple motion vectors if the object changes direction over time.

At action 906, the identified sequences of motion vectors are used to determine one or more cluster motion types for the associated clusters. The cluster motion types may be derived from the transition types of individual motion vectors associated with the clusters. The cluster motion types may be specified by a domain model, such that motion in a particular direction (e.g., north, south, east, west), or motion relative to a particular point (e.g., away from the centroid of the cluster) is associated with a particular type value. Other characteristics that have been determined for the particular cluster may also be considered when determining a cluster motion type. Some clusters may be associated with multiple sequences of motion vectors that indicate a change in direction over time, or multiple sequences of motion vectors may be used to indicate changes to the size, shape, and/or density of the cluster. For example, in the context of precipitation, sequences of motion vectors that lead away from the centroid of the cluster along with a reduction in the density of the cluster may be classified as "dispersing." In some embodiments, individual transition types of the motion vectors may also be used to derive a cluster motion type. For example, if a majority motion vectors associated with the cluster chain are described as "Spreading", then the cluster motion type may be identified as "Spreading" as well. As another example, a precipitation object may move from a first region to a second region and increase in area, resulting in a classification of "spreading" over the second region. As yet another example, a precipitation object might move in a uniform direction without changing in size or shape, and be classified as a "moving band" of precipitation. The relationship between individual motion vector types and the cluster motion type as a whole may be a many to one relation or a one to one relationship. For example, many motion vectors, in aggregate, may be used to define a cluster motion type. Alternatively or additionally, a single repeating motion vector type may define the motion cluster type. Objects may also be classified as "static" (e.g., no associated motion vector), or "hybrid" (e.g., a more erratic or chaotic sequence of motion, with motion vectors in different directions), based on the analyzed motion vectors.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for identifying a moving object in spatial data, the apparatus comprising at least one processor and at least one memory storing instructions that, with the processor, cause the apparatus to: identify a first cluster and a second cluster of a plurality of clusters in a sequence of spatial data frames, wherein the first cluster is associated with a first time value and the second cluster is associated with a second time value; determine that the first cluster corresponds to the second cluster based on a similarity score computed for the first cluster at the first time value with the second cluster at the second cluster value, wherein the similarity score is based at least on a determined domain model; wherein to determine that the first cluster corresponds to the second cluster, the apparatus is configured to: select the first cluster and the second cluster for pairing in a circumstance where the similarity score is (1) a maximized cluster similarity score for the first cluster and the second cluster in the plurality of clusters, or (2) a maximized frame similarity score associated with the sequence of spatial data frames; and generate, using a natural language generation system, an output text linguistically describing a moving object identified in part based on a motion vector between the first cluster and the second cluster.

2. The apparatus of claim 1, wherein the cluster similarity score is computed based in part on one or more of:
a determined a first time value location of each of the first cluster and the second cluster at the first time value; and
a determined second time value location of each of the first cluster and the second cluster at the second time value.

3. The apparatus of claim 1, wherein the sequence of spatial data frames represents spatial data of spatial-temporal data, received from a spatial data source, as a sequence of image-like objects.

4. The apparatus of claim 3, wherein the spatial-temporal data comprises a combination of time series and spatial data.

5. The apparatus of claim 1, wherein the sequence of spatial data frames defines one or more time value locations of the plurality of clusters at a plurality of time values.

6. The apparatus of claim 5, wherein the sequence of spatial data frames is represented as a set of frames, wherein each frame of the set of frames corresponds to a time value of the plurality of time values.

7. The apparatus of claim 1, wherein the first cluster is associated with a first set of attributes and the second cluster is associated with a second set of attributes.

8. The apparatus of claim 1, wherein the motion vector comprises a speed and a direction of motion.

9. The apparatus of claim 1, wherein the first cluster is determined as corresponding to the second cluster based on one of maximizing the cluster similarity score for the first cluster or maximizing a frame similarity score, the frame similarity score derived from the similarity score of each cluster at the first time value to at least one object at the second time value.

10. A method for identifying a moving object in spatial data, the method comprising: identifying a first cluster and a second cluster of a plurality of clusters in a sequence of spatial data frames, wherein the first cluster is associated with a first time value and the second cluster is associated with a second time value; determining that the first cluster corresponds to the second cluster based on a similarity score computed for the first cluster at the first time value with the second cluster at the second cluster value, wherein the similarity score is based at least on a determined domain model; wherein determining that the first cluster corresponds to the second cluster comprises: selecting the first cluster and the second cluster for pairing in a circumstance where the similarity score is (1) a maximized cluster similarity score for the first cluster and the second cluster in the plurality of clusters, or (2) a maximized frame similarity score associated with the sequence of spatial data frames; and generating, using a natural language generation system, an output text linguistically describing a moving object identified in part based on a motion vector between the first cluster and the second cluster.

11. The method of claim 10, wherein the cluster similarity score is computed based in part on one or more of:
a determined a first time value location of each of the first cluster and the second cluster at the first time value; and
a determined second time value location of each of the first cluster and the second cluster at the second time value.

12. The method of claim 10, wherein the sequence of spatial data frames represents spatial data of spatial-temporal data, received from a spatial data source, as a sequence of image-like objects.

13. The method of claim 12, wherein the spatial-temporal data comprises a combination of time series and spatial data.

14. The method of claim 10, wherein the sequence of spatial data frames defines one or more time value locations of the plurality of clusters at a plurality of time values.

15. The method of claim 14, wherein the sequence of spatial data frames is represented as a set of frames, wherein each frame of the set of frames corresponds to a time value of the plurality of time values.

16. The method of claim 10, wherein the first cluster is associated with a first set of attributes and the second cluster is associated with a second set of attributes.

17. The method of claim 10, wherein the motion vector comprises a speed and a direction of motion.

18. The method of claim 10, wherein the first cluster is determined as corresponding to the second cluster based on one of maximizing the cluster similarity score for the first cluster or maximizing a frame similarity score, the frame similarity score derived from the similarity score of each cluster at the first time value to at least one object at the second time value.

* * * * *